(12) United States Patent
Vandwalle et al.

(10) Patent No.: US 8,306,014 B1
(45) Date of Patent: *Nov. 6, 2012

(54) SYSTEM AND METHOD FOR SYNCHRONIZING CLOCKS IN A WIRELESS LOCAL AREA NETWORK

(75) Inventors: Pierre Vandwalle, Sunnyvale, CA (US); Yiwen Zhou, San Ramon, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,040

(22) Filed: Jul. 11, 2011

Related U.S. Application Data

(63) Continuation of application No. 12/056,913, filed on Mar. 27, 2008, now Pat. No. 7,978,680.

(60) Provisional application No. 60/908,521, filed on Mar. 28, 2007.

(51) Int. Cl.
*H04J 3/06* (2006.01)

(52) U.S. Cl. ........................................... 370/350

(58) Field of Classification Search .................. None
See application file for complete search history.

(56) References Cited

U.S. PATENT DOCUMENTS

| | | | |
|---|---|---|---|
| 7,221,686 B1 * | 5/2007 | Belcea | 370/509 |
| 7,260,657 B2 * | 8/2007 | Matsumoto et al. | 375/355 |
| 7,295,159 B1 * | 11/2007 | Belcea et al. | 342/465 |
| 7,590,151 B2 | 9/2009 | Middleton et al. | |
| 7,664,145 B2 | 2/2010 | Akamatsu et al. | |
| 7,873,024 B1 * | 1/2011 | Fenwick et al. | 370/350 |
| 8,014,378 B1 * | 9/2011 | Yoon et al. | 370/350 |
| 2002/0093590 A1 * | 7/2002 | Hodgkiss et al. | 348/500 |
| 2002/0181438 A1 * | 12/2002 | McGibney | 370/350 |
| 2003/0048811 A1 * | 3/2003 | Robie et al. | 370/509 |
| 2003/0086442 A1 * | 5/2003 | Reynolds et al. | 370/503 |
| 2004/0047307 A1 * | 3/2004 | Yoon et al. | 370/324 |
| 2004/0137962 A1 * | 7/2004 | Cannon et al. | 455/574 |
| 2004/0153534 A1 * | 8/2004 | Gibart et al. | 709/223 |
| 2005/0169233 A1 | 8/2005 | Kandala et al. | |
| 2005/0201421 A1 * | 9/2005 | Bhandari et al. | 370/519 |
| 2007/0076822 A1 * | 4/2007 | Miller et al. | 375/327 |
| 2007/0091934 A1 | 4/2007 | Myles et al. | |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

*Primary Examiner* — Anh-Vu Ly

(57) ABSTRACT

A first network device including: a first clock module configured to generate a first clock signal; and a first clock control module configured to control the first clock signal to have a first frequency. The first clock control module includes a report reception and analysis module configured to: analyze a first signal, received from a second network device, to determine whether a second frequency of a second clock signal associated with the second network device requires adjustment in order to be synchronized with the first frequency of the first clock signal; and in response to the second frequency of the second clock signal requiring adjustment, generate a second signal to be transmitted via the antenna to the second network device, wherein the second signal is useable by the second network device to synchronize the second frequency of the second clock signal to the first frequency of the first clock signal.

20 Claims, 11 Drawing Sheets

OTHER PUBLICATIONS

IEEE P802.11g/D8.2, Apr. 2003 (Supplement to ANSI/IEEE Std 802.11-1999 (Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aol Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE Std 802.11h™-2003 [Amendment to IEEE Std 802.11™, 1999 Edition (Reaff 2003) as amended by IEE Stds 802.11a™-1999, 802.11b™-1999, 802.11b™-1999/Cor 1-2001, 802.11d™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

* cited by examiner

SYSTEM AND METHOD FOR SYNCHRONIZING CLOCKS IN A WIRELESS LOCAL AREA NETWORK

CROSS-REFERENCE TO RELATED APPLICATIONS

This present disclosure is a continuation of U.S. application Ser. No. 12/056,913, filed on Mar. 27, 2008, which claims priority under 35 U.S.C. §119(e) to U.S. Provisional Application No. 60/908,521, filed on Mar. 28, 2007.

FIELD

The present disclosure relates to wireless networks, and more particularly to adjusting clocks within devices of the wireless network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

IEEE standards 802.11, 802.11a, 802.11b, 802.11g, 802.11h, 802.11n, 802.16, and 802.20, which are hereby incorporated by reference in their entirety, define several different standards for configuring wireless networks and devices. According to these standards, network devices may be operated in either an infrastructure mode or an ad-hoc mode. In the infrastructure mode, network devices communicate with each other through an access point (AP). In the ad-hoc mode, wireless network devices communicate directly with each other and do not employ an AP.

Referring now to FIG. 1, an exemplary Wireless Local Area Network (WLAN) 10 is shown in an infrastructure mode as defined by IEEE 802.11. The wireless network 10 includes one or more network devices 12-1, 12-2, . . . , and 12-N (collectively referred to as network devices 12) and one or more APs 14. The network devices 12 and the AP 14 transmit and receive wireless signals 16 over an RF channel. The wireless network devices may include routers, switches, gateways, modems, or other network devices. The network devices may be included within client stations such as laptop computers, audio devices, such as speakers or video devices, such as high definition televisions. The AP 14 is a node in a network 18. The network 18 may include other nodes such as a server 19 and may be connected to a distributed communications system 20, such as the Internet.

Referring now to FIG. 2, a second wireless network 24 operates in an ad-hoc mode. The second wireless network 24 includes multiple network devices 26-1, 26-2, . . . , and 26-M (collectively referred to as network devices 26) that transmit and receive wireless signals 28. The network devices 26 collectively form a LAN and communicate directly with each other. The network devices 26 are not necessarily connected to another network.

The network devices 26 may not continuously transmit data to and receive data from each other. For example, the network devices 26 may implement a power savings mode when one of the network devices 26-1 does not have data to exchange with the other network devices 26-2 and 26-M. Each network device 26 may transmit data in a deterministic order. For example, the network devices 26 may transmit data sequentially in time.

SUMMARY

In general, in one aspect, this specification describes a first network device including: a first clock module configured to generate a first clock signal; and a first clock control module configured to control the first clock signal to have a first frequency. The first clock control module includes a report reception and analysis module configured to: analyze a first signal, wirelessly received from a second network device, to determine whether a second frequency of a second clock signal associated with the second network device requires adjustment in order to be synchronized with the first frequency of the first clock signal; and in response to the second frequency of the second clock signal requiring adjustment, generate a second signal to be wirelessly transmitted via the antenna to the second network device, wherein the second signal is useable by the second network device to synchronize the second frequency of the second clock signal to the first frequency of the first clock signal.

Further areas of applicability will become apparent from the description provided herein. The description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
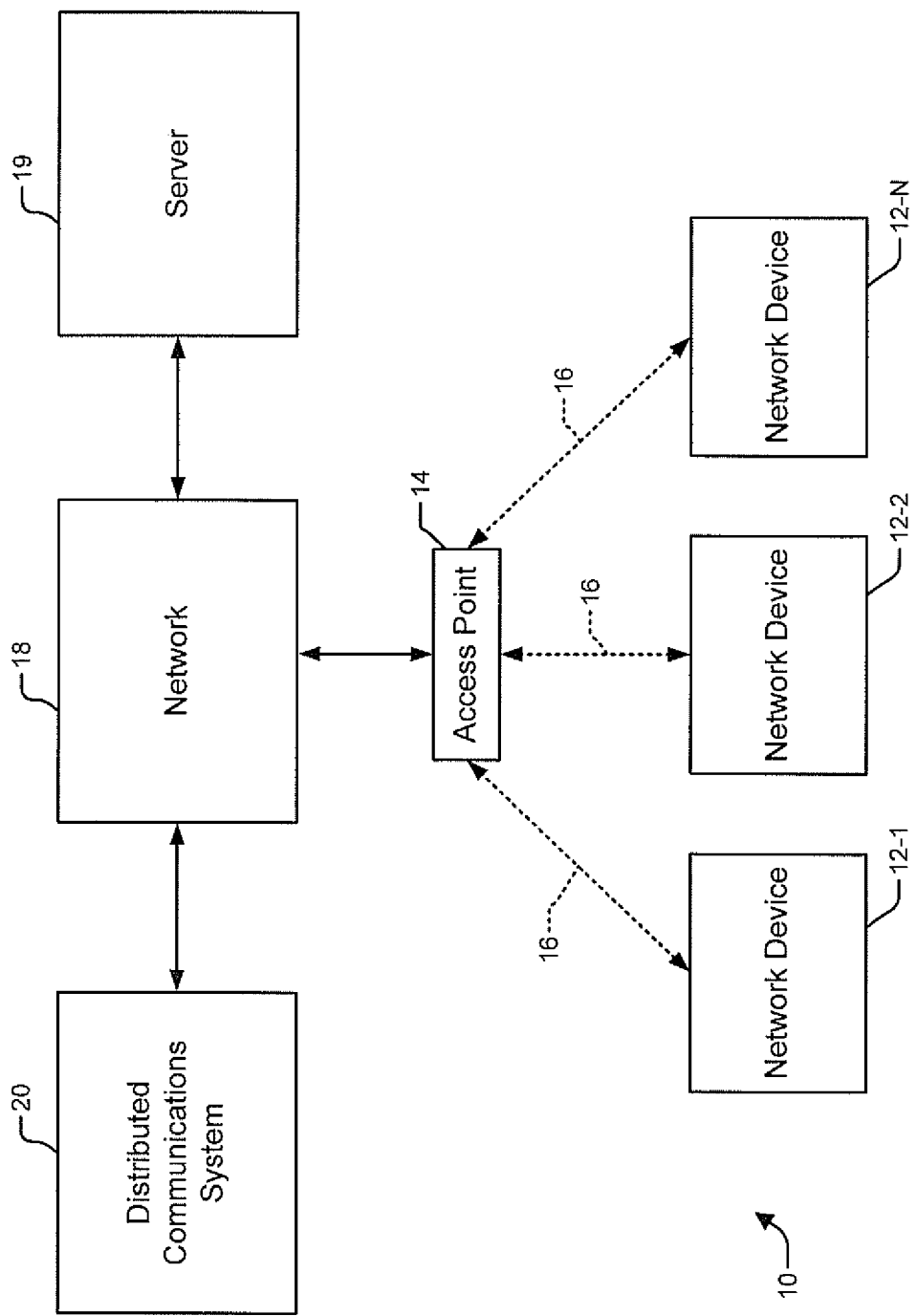
FIG. 1 is a functional block diagram of a wireless network that is configured in an infrastructure mode according to the prior art.
Figure 2:
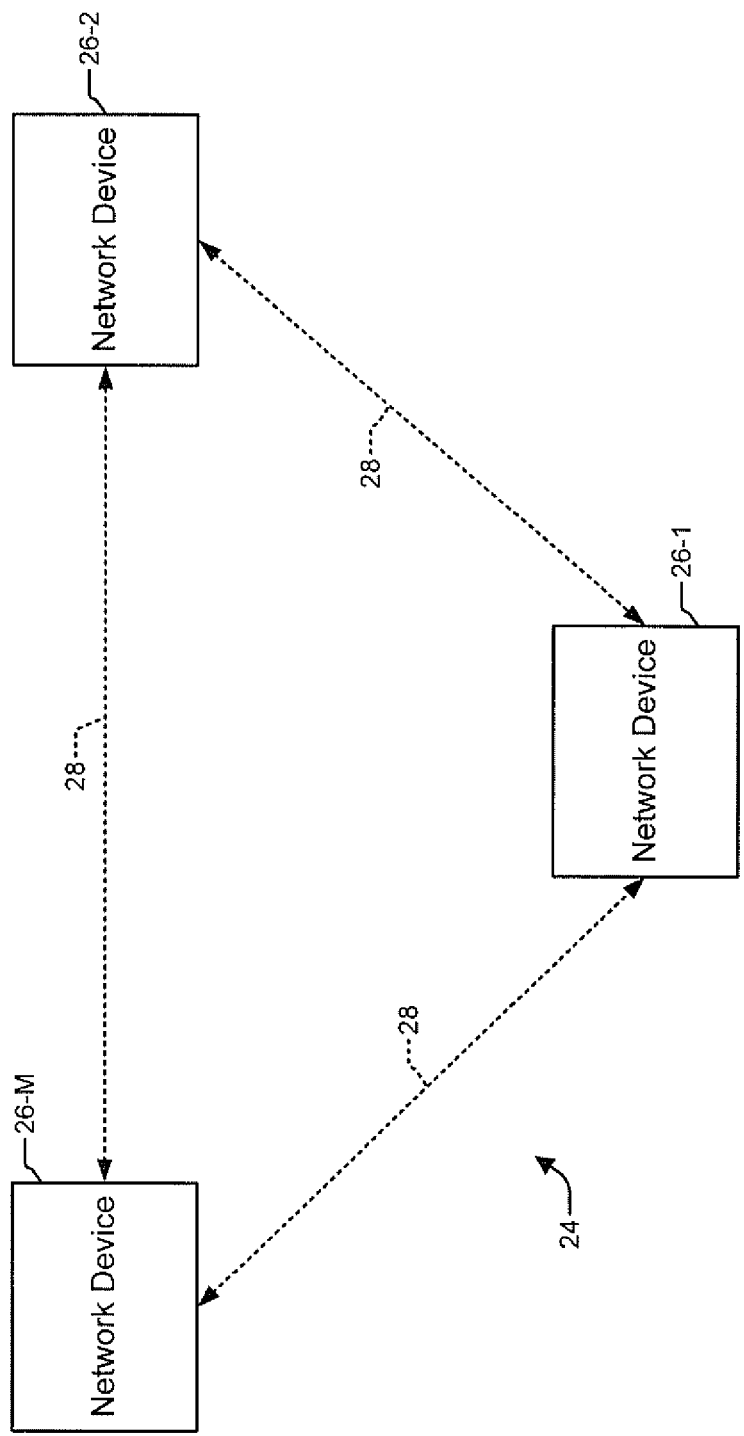
FIG. 2 is a functional block diagram of a wireless network that is configured in an ad-hoc mode according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. Steps within a method may be executed in different order or concurrently without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Internal clocks of network devices may diverge from a reference time with which the internal clocks were previously synchronized. Typically, the internal clock times vary from the external time as a function of elapsed time since synchronization. The present disclosure limits clock drift and offset by resynchronizing the internal clocks.

Figure 3A:
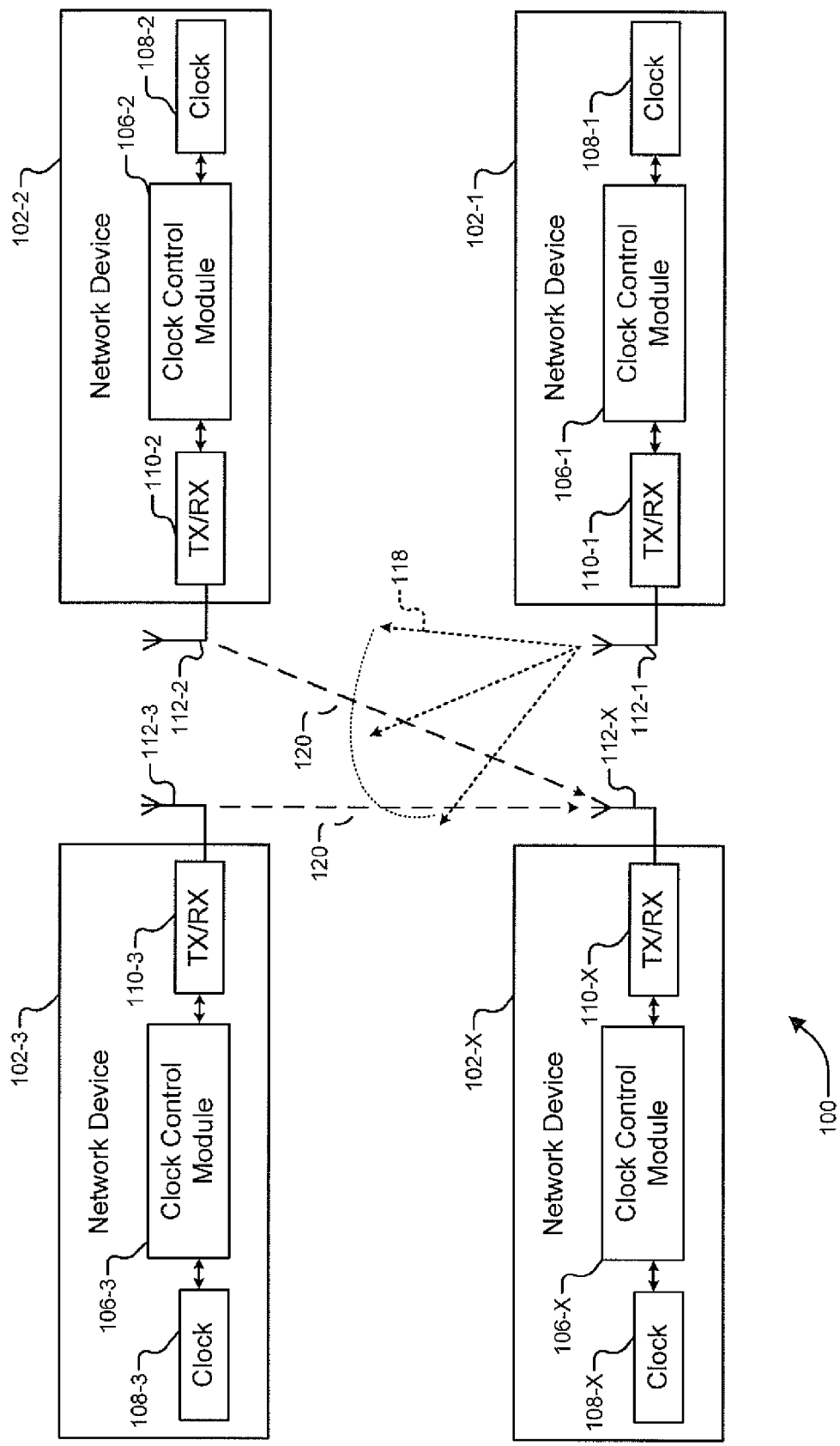
FIG. 3A is a functional block diagram of a wireless network that is configured in an ad-hoc mode according to the present disclosure.
Figure 3B:
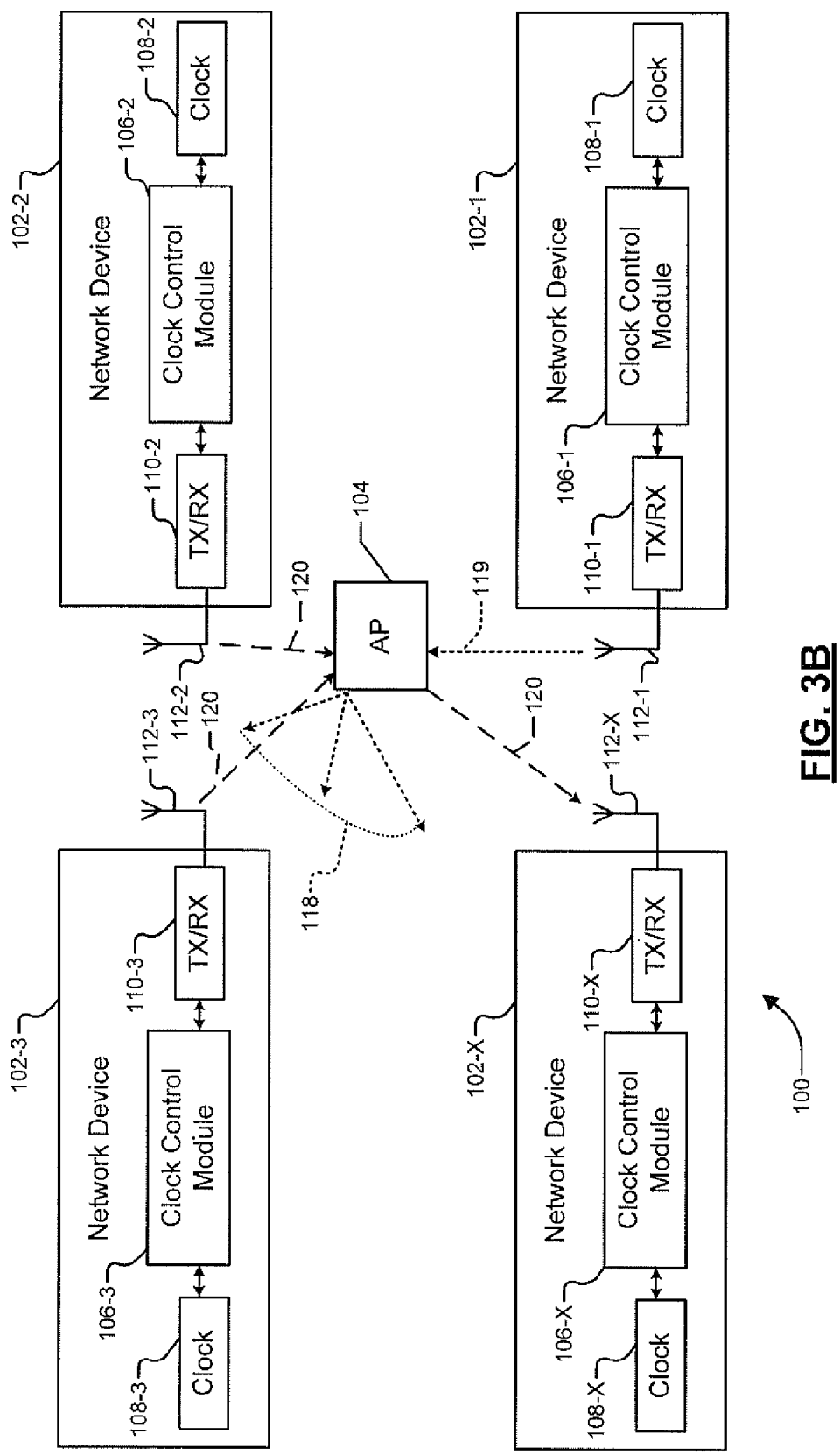
FIG. 3B is a functional block diagram of a wireless network that is configured in an infrastructure mode according to the present disclosure.

Referring now to FIGS. 3A-3B, a wireless network 100, which may be a wireless local area network (WLAN), includes a plurality of network devices 102-1, 102-2, ..., and 102-X (collectively referred to as network devices 102). Each of the network devices 102 may include one or more devices, such as routers, switches, gateways, modems or other network devices. The network devices 102 may also be included within client stations such as laptop computers, audio devices, such as speakers or video devices, such as high definition televisions. The network devices 102 may operate in an ad hoc mode, as in FIG. 3A or in an infrastructure mode with an access point (AP) 104, as in FIG. 3B. For example, the network devices correspond to a plurality of wireless speakers, where each wireless speaker is a separate network device. All of the speakers synchronize their respective clocks, which may be driven by an independent adjustable phase-locked loop (PLL).

The network devices 102 may each include respective local clock control modules 106-1, 106-2, ..., and 106-X (collectively referred to as clock control modules 106). The clock control modules 106 may control respective local clock modules 108-1, 108-2, ..., and 108-X (collectively referred to as clocks 108). The network devices 102 may be external to each other and may therefore communicate with each other via radio frequency (RF) transceivers 110-1, 110-2, ..., and 110-X (collectively referred to as transceivers 110). The transceivers 110 may transmit signals via antennas 112-1, 112-2, ..., and 112-X (collectively referred to as antennas 112).

One or more of the control modules 106 may select one of the network devices, for example network device 102-X, to act as a reference network device and its clock 108-X a reference clock. Clocks of network devices other than the reference network device 102-X may be synchronized to the clock 108-X of the reference network device 102-X.

Further, one of the network devices, for example network device 102-1, may not be synchronized to the reference network device 102-X and may be designated as a frame network device by the control modules 106. In FIG. 3A, the frame network device 102-1 may broadcast or multicast a plurality of synchronization frames 118 to the other network devices 102-2, 102-3, ... 102-X at the request of the reference network device 102-X. In FIG. 3B, the frame network device 102-1 may transmit a unicast signal 119 that includes the frames and a command for the AP 104 to multicast the signal 119 to the network devices 102. Alternatively, the reference network device 102-X may transmit the synchronization frames 118. In one embodiment, synchronization frames 118 may be broadcast or multicast so that they are delivered at the same instant to all the network devices 102-2, 102-3, ... 102-X regardless of the topology of the network used. Examples of network topologies are seen in FIGS. 3A-3B.

Control modules 106-2, 106-3 of the non-reference network devices 102-2, 102-3 measure receive time (Rx) of the synchronization frames using clocks 108-2, 108-3, respectively. Control modules 106-2, 106-3 also generate respective report signals 120 based on the receive time measurements. The respective report signals 120 may include frames of one or more data packets that include timestamps of the frame receive times. The reference network device 102-X generates a synchronization signal based on the synchronization frames and the report signals 120. The other network devices 102-2, 102-3 synchronize respective clocks 108-2, 108-3 based on the synchronization signal. Network devices 102 may transmit data using an orthogonal frequency-division multiplexing (OFDM) protocol. OFDM employs a coding scheme where each transceiver 110 is assigned a sub-carrier to carry data to allow multiple network devices 102 to be multiplexed over the same channel.

Figure 4:
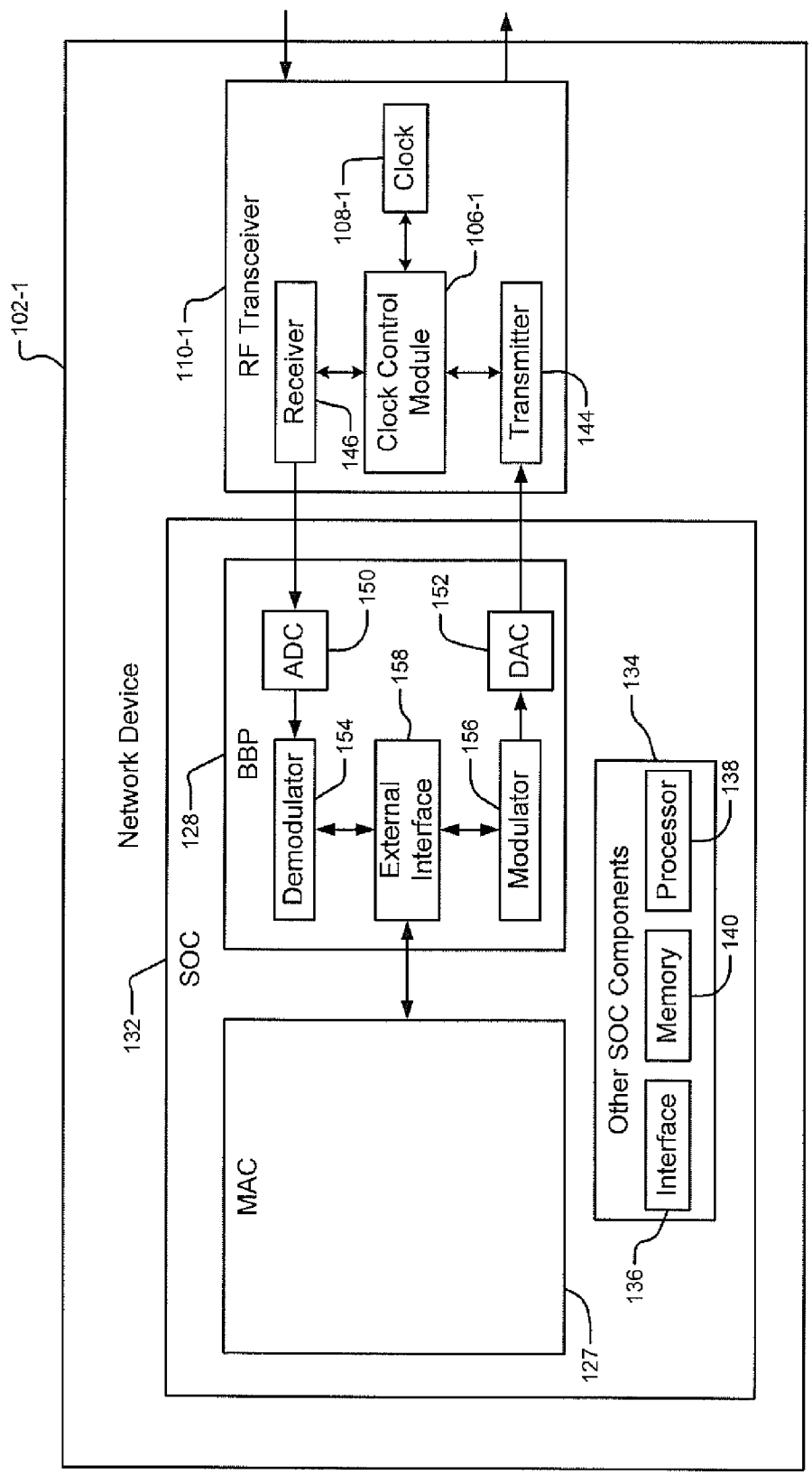
FIG. 4 is a functional block diagram of an exemplary network device according to the present disclosure.
Figure 5:
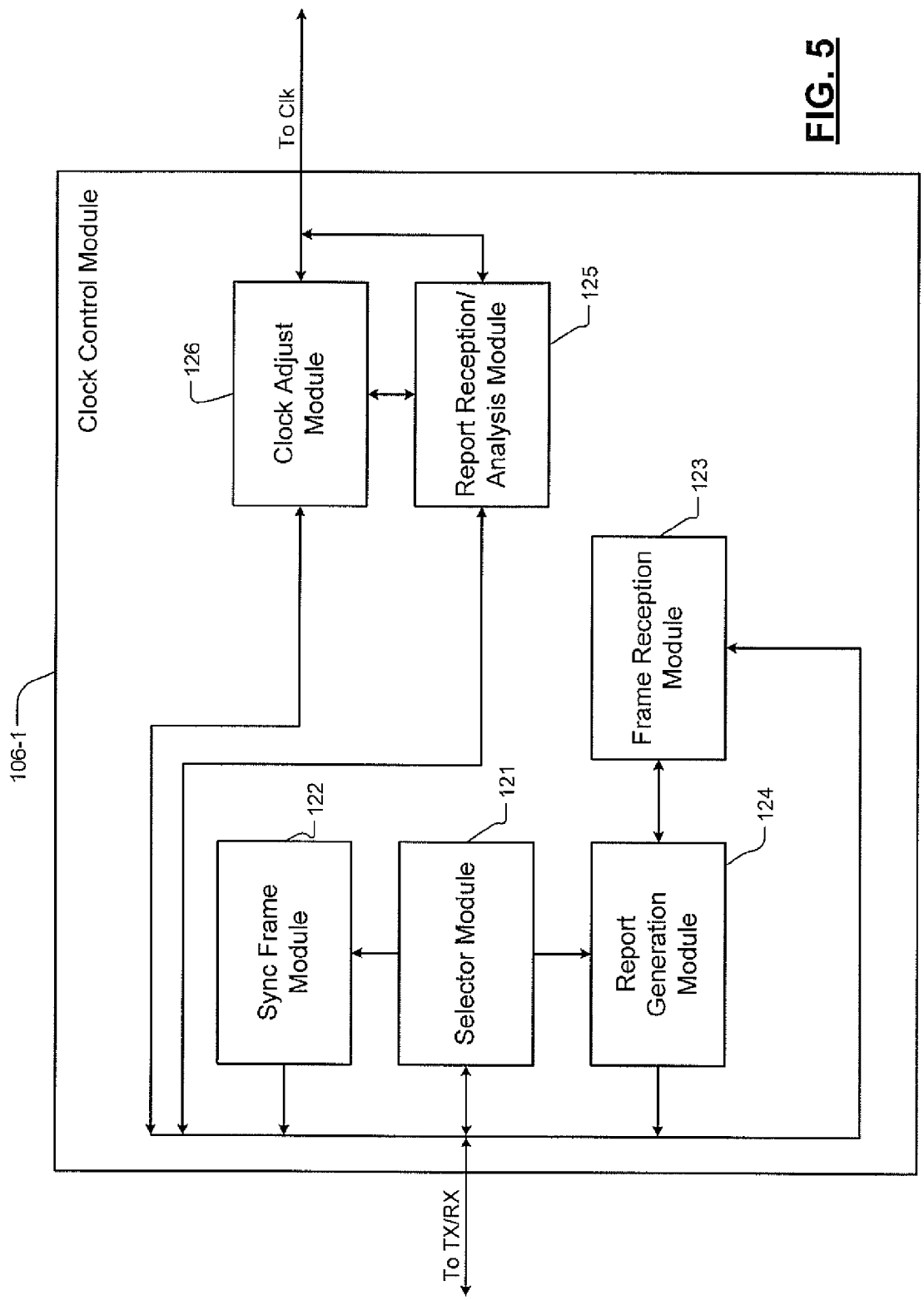
FIG. 5 is a functional block diagram of an exemplary clock control module according to the present disclosure.

Referring now to FIGS. 4-5 each of the network devices 102 may include some or all of the modules illustrated. Further, each of the network devices 102 may act as a reference network device and/or a frame network device. An exemplary network device 102-1 therefore includes a clock control module 106-1 that provides clock signals from a clock 108-1. The clock control module 106-1 may also control phase and/or frequency of the clock 108-1. The clock 108-1 may include, for example, a crystal oscillator (XOSC) and/or PLL.

The clock control module 106-1 may include a selector module 121 that selects one of the network devices 102 as the reference network device. Selection may be based on, for example, a round-robin scheme. In the round-robin scheme, each network device 102 may be selected to be the reference network device for a predetermined time period or for a predetermined number of frames transmitted through the network 100. Further, reference selection modules from one or more network devices 102 may agree (arbitrarily or otherwise) to a particular reference network device. Alternatively, one of the network devices 102 may always be designated as the reference network device.

The clock control module 106-1 may also include a synchronization frame module 122 that generates a plurality of frames, which may be WLAN frames. The frames may include, for example, a media access control (MAC) address of the reference network device, the number of frames that are to be transmitted, and an interval between the frames. The interval may be measured by the control module of the frame network device based on the clock of the frame network device. The frames may also include a unique identification (ID) allocated by the reference network device. The frames may also include a unicast destination address, multicast destination addresses or broadcast destination addresses for the frames. The synchronization frame module 122 may transmit the frames via the antenna 112-1.

The clock control module 106-1 may also include a frame reception module 123 that may use the respective clock 108-1 to stamp the time that the network device 102-1 receives each respective frame. A report generation module 124 generates a report signal that indicates the receive time of the frames.

The clock control module 106-1 may also include a report reception and analysis module 125 that analyzes report signals from multiple network devices based on the reference clock 108-1. The report signals may include protocol fields such as source ID, sequence number indicating the order the report signals were sent, and source MAC address to identify the originating network device for each report. The report analysis module 125 may therefore identify the originating network device based on the protocol fields.

The report reception and analysis module 125 may determine offset and/or drift for clocks other than the reference clock 108-1. The clock drift occurs when a clock has a different frequency than the reference clock 108-1. Clock offset refers to a non-zero absolute difference between a clock and the reference clock. Difference between two clocks may therefore be determined by measuring drift and offset at a specific point in time.

For example, to determine drift and/or offset, the reference network device 102-1 first receives the frames (for example a first frame and a second frame) and calculates a Δ time and arrival time. Δ time=(Rx timestamp for second frame−Rx timestamp for first frame). Arrival time=Rx timestamp of first frame. Upon reception of the report signals from the non-reference network devices, the reference network device 102-1 may determine drift=(Report Rx timestamp of second frame−Report Rx timestamp of first frame)/Δ time. The reference network device 102-1 may determine offset=Report Rx timestamp of the first frame arrival time.

For example, the first and second frames are received at the reference network device 102-1 with a 10 second (s) interval between them (measured via the reference clock 108-1). The first and second frames are also received at first and second non-reference network devices. Exemplary non-reference network device intervals are 10.01 s and 9.9996 s intervals (measured via respective local clocks). The reference network device 102-1 receives the first frame at time 1000 μs (arrival time) and first and second non-reference network devices receive the first frame at time 4444 μs and 2000 μs, respectively. Then drift for the first non-reference network device is (10.01 s−10 s)/10 s=1000. Drift for the non-reference network device is (9.9996 s−10 s)/10 s=−40. Offset for the first non-reference network device is 4444 μs−1000 μs=3444 μs. Offset for the non-reference network device is 2000 μs−1000 μs=1000 μs. Performance of the present disclosure may be characterized by calculating precision that can be reached in terms of clock synchronization (for example ±0.1 ppm) versus the length of time required to reach that precision in a second unit. Previous systems required large amounts of time (for example days) to reach a ±0.1 ppm precision, whereas the present disclosure may only require a small amount of time, such as 10 sec.

Figure 6B:
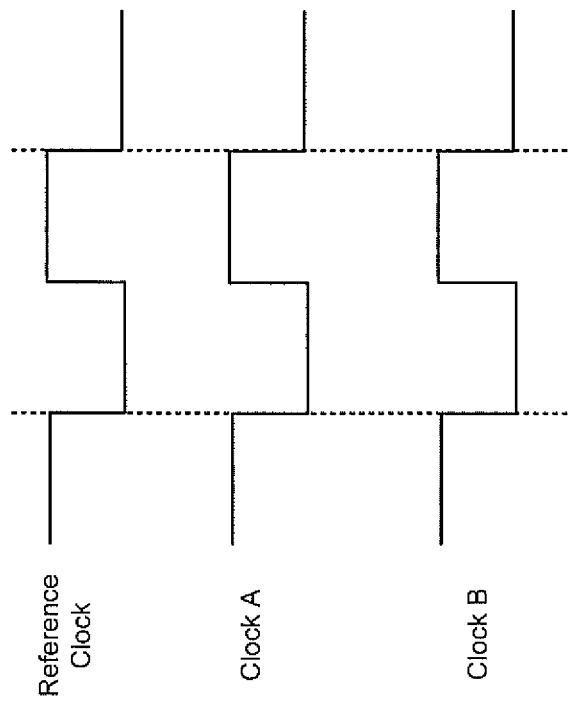
FIG. 6B is a timing diagram that illustrates synchronized clocks.
Figure 6A:
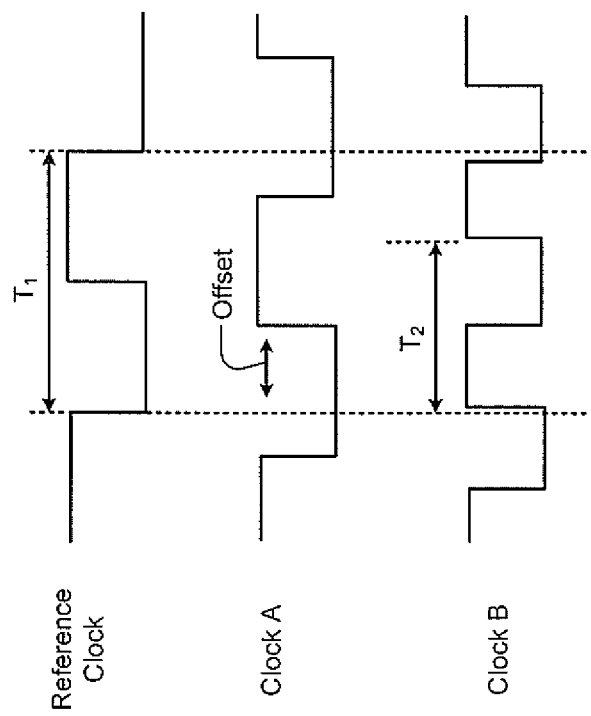
FIG. 6A is a timing diagram that illustrates clock offset and drift.

Referring now to FIGS. 6A-6B, the clock control module 106-1 may also include a clock adjustment module 126. The clock adjustment module 126 may adjust the clock 108-1 based on a reference clock when the network device is not a reference network device. When the network device 102-1 is a reference network device, the clock adjustment module 126 may generate adjustment signals to respective non-reference network devices. The adjustment signals may, for example, cause respective clock control modules to resample respective clocks. The respective clock control modules may also adjust the non-reference clocks by providing respective PLLs with reference signals based on clock adjustment module signals. The PLLs therefore adjust frequency of respective crystal oscillators to match the reference signal so that respective clocks match the reference clock in both frequency and phase.

For example, in FIG. 6A, clock signals A, B from first and second non-reference network devices, respectively, are illustrated. The clock signal A is offset from the reference clock 108-1, and the clock signal B has a period $T_2$ that differs from the period $T_1$ of the reference clock 108-1. The clock adjustment module 126 transmits a first adjustment signal to the first non-reference network device to compensate for the offset. The clock adjustment module 126 also transmits a second adjustment signal to the second non-reference network device to compensate for the difference in period. Clocks A, B are adjusted based on the first and second adjustment signals, respectively, to synchronize with the reference clock, as in FIG. 6B.

The network device 102-1 may also include a system on chip (SOC) 132 that includes a media access control (MAC) device 127, a baseband processor (BBP) 128, and other SOC components 134. For example, the other SOC components 134 may include a host interface 136, a processor 138, and memory 140. The transceiver 110-1 wirelessly transmits/receives data to/from network devices in the WLAN and includes a transmitter 144 and a receiver 146.

The BBP 128 modulates/demodulates signals between the transceiver 110-1 and the MAC device 127. The BBP 128 includes an analog to digital converter (ADC) 150, a digital to analog converter (DAC) 152, a demodulator 154, and a modulator 156. The ADC 150 receives signals from the receiver 146. The ADC 150 communicates with the demodulator 154, which demodulates the signals. A MAC interface 158 communicates with the MAC device 127. Conversely, the MAC device 127 sends signals to the MAC interface 158. The modulator 156 modulates the signals from the MAC device 127 and the DAC 152 outputs signals to the transmitter 144.

Figure 7:
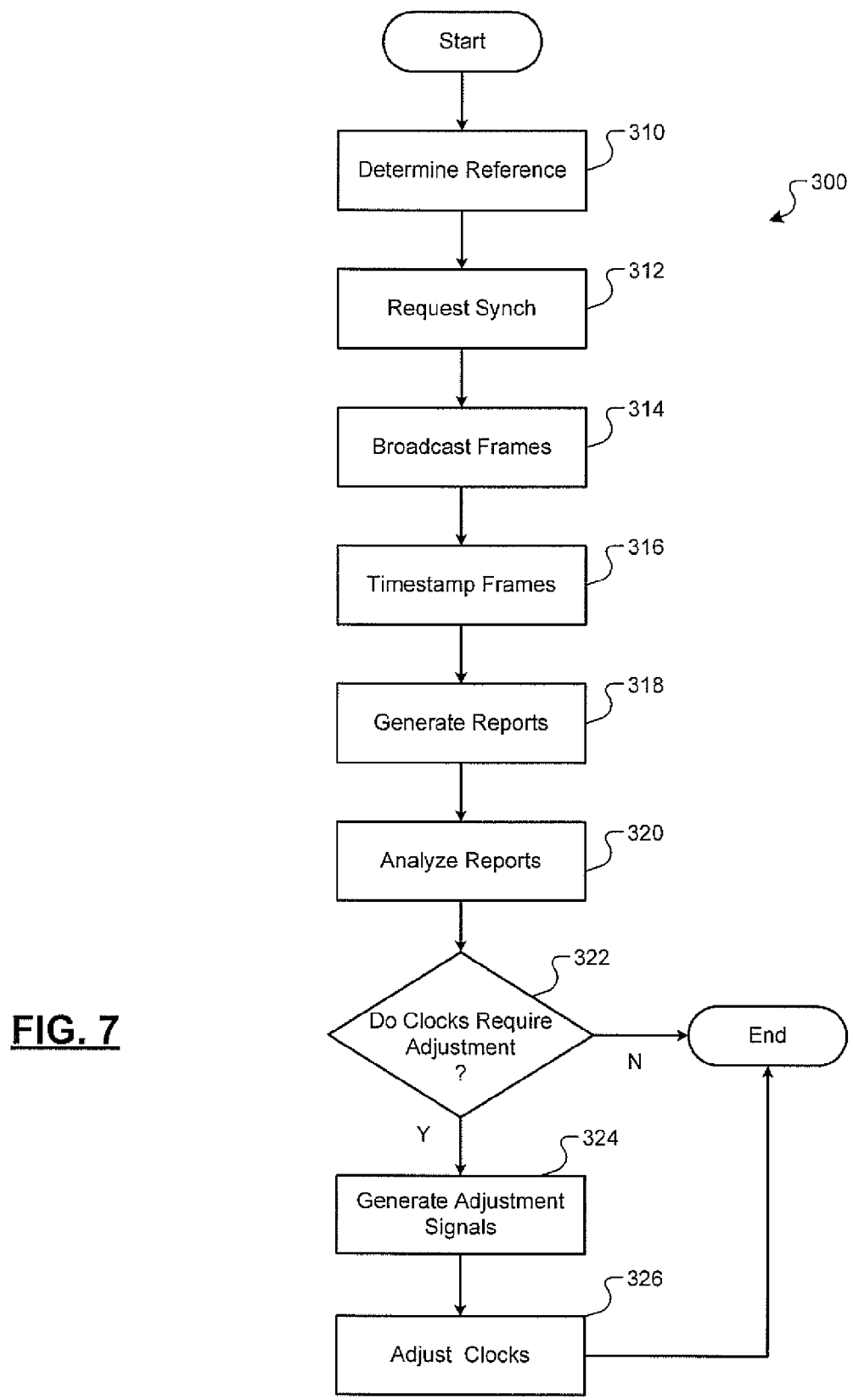
FIG. 7 is a flowchart that illustrates steps performed by network devices of a wireless network according to the present disclosure.

Referring now to FIG. 7 a method 300 for operating a network 100 is illustrated. Control starts in step 310 when the network devices 102 select a reference network device (for example, network device 102-X). In step 312, one or more of the network devices 102 requests a synchronization operation. For example, the reference network device 102-X sends a request to a non-reference network device 102-1 to initiate synchronization. In step 314, the network device 102-1 broadcasts or multicasts frames to the reference network device and other network devices 102-2, 102-3. The network device 102-1 may merely broadcast/multicast frames and may not receive frames. The frames may include MAC address information for the reference network device 102-X and/or the network device 102-1.

In step 316, the network devices 102-X, 102-2, 102-3 timestamp the frames. In step 318, the network devices 102-2, 102-3 generate reports that include respective MAC addresses and/or other information that identifies the respective network devices 102-2, 102-3 that originated the reports. In step 320, the reference network device 102-X receives and analyzes the reports and determines whether clocks 108-2, 108-3 from network devices 102-2, 102-3 require adjustment. In step 322, if the clocks 108-2, 108-3 require adjustment, the reference network device 102-X generates adjustment signals in step 324. In step 326, control modules 106-2, 106-3 of network devices 102-2, 102-3 adjust clocks 108-2, 108-3 in response to the adjustment signals.

Referring now to FIGS. 8A-8E, various exemplary implementations incorporating the teachings of the present disclosure are shown.

Figure 8A:
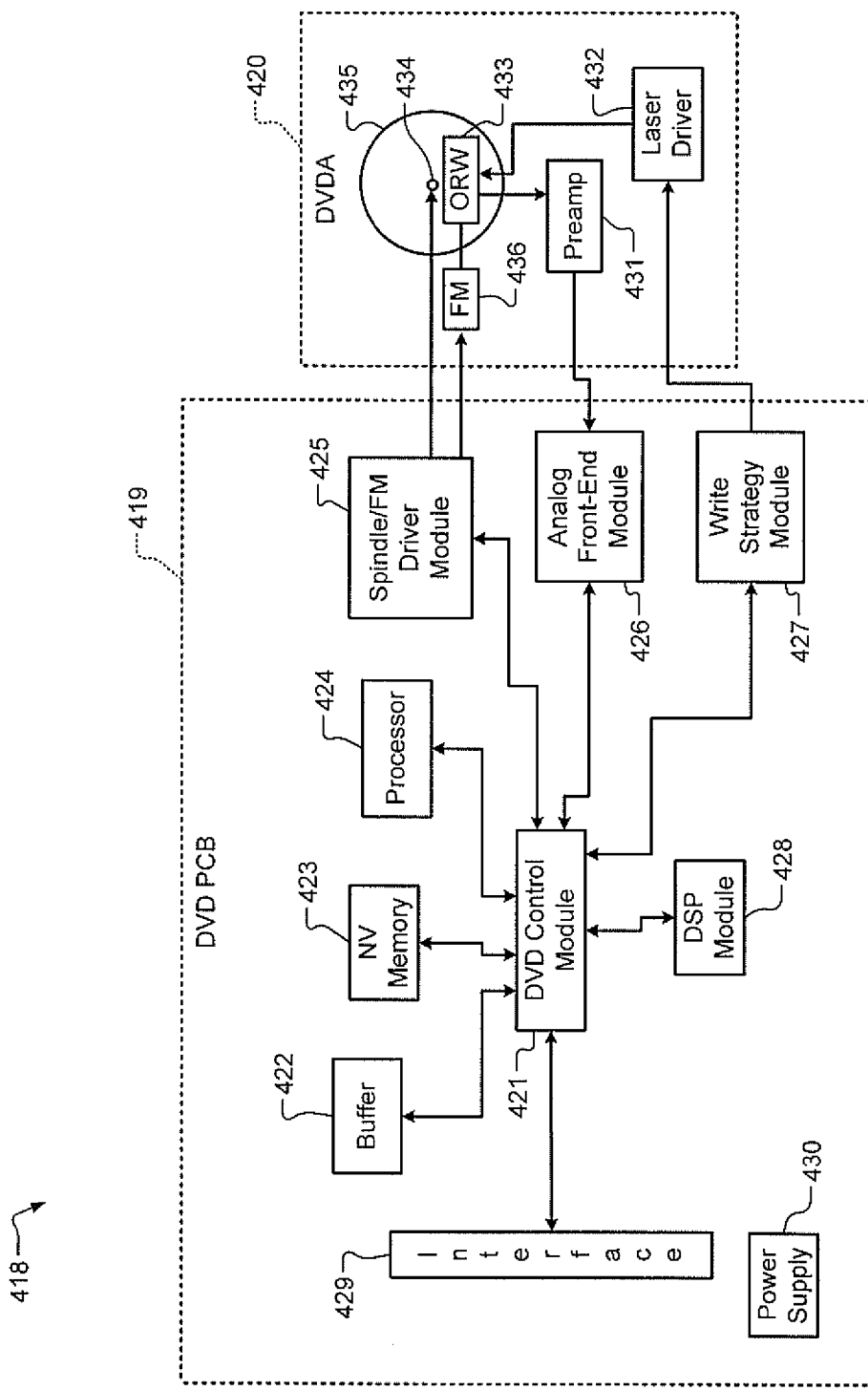
FIG. 8A is a functional block diagram of a DVD drive.

Referring now to FIG. 8A, the teachings of the disclosure can be implemented in a wireless interface of a DVD drive 418 or of a CD drive (not shown). The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with other network devices (not shown) via the interface 429. The other client modules may include a computer, a multimedia device, a mobile computing device, a speaker, etc.

The DVD control module 421 may receive data from the buffer 422, nonvolatile memory 423, the processor 424, the spindle/FM driver module 425, the analog front-end module 426, the write strategy module 427, the DSP module 428, and/or the interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the interface 429.

The DVD control module 421 may use the buffer 422 and/or nonvolatile memory 423 to store data related to the control and operation of the DVD drive 418. The buffer 422 may include DRAM, SDRAM, etc. Nonvolatile memory 423 may include any suitable type of semiconductor or solid-state memory, such as flash memory (including NAND and NOR flash memory), phase change memory, magnetic RAM, and multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Figure 8C:
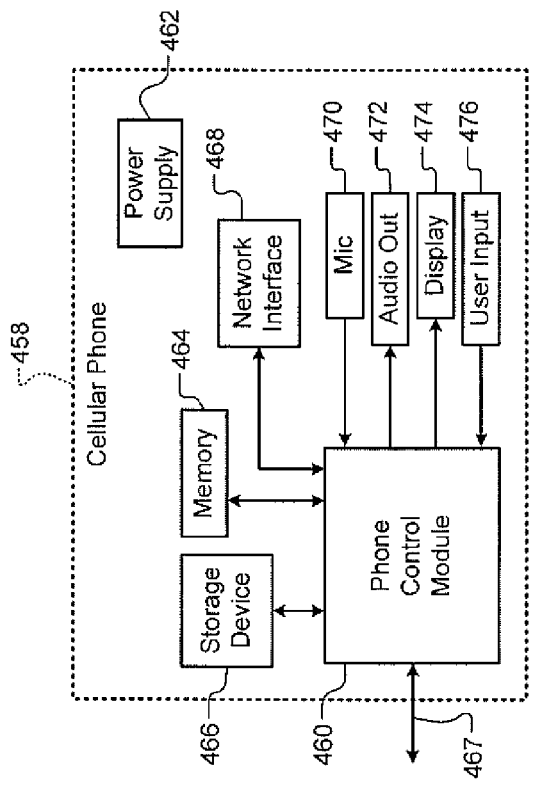
FIG. 8C is a functional block diagram of a cellular phone.
Figure 8B:
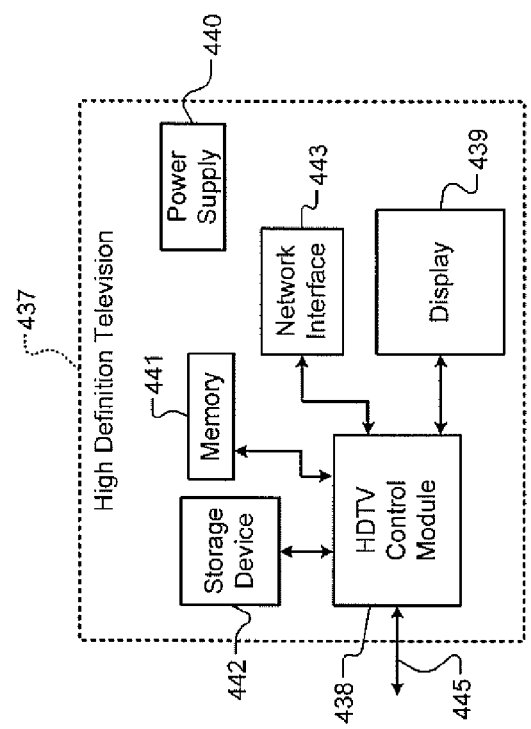
FIG. 8B is a functional block diagram of a high definition television.

Referring now to FIG. 8B, the teachings of the disclosure can be implemented in a network interface of a high definition television (HDTV) 437. The HDTV 437 includes the HDTV control module 438, a display 439, a power supply 440, memory 441, a storage device 442, the network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 8C, the teachings of the disclosure can be implemented in a network interface of a cellular phone 458. The cellular phone 458 includes a phone control module 460, a power supply 462, memory 464, a storage device 466, and a cellular network interface 467. The cellular phone 458 may include the network interface 468, a microphone 470, an audio output 472 such as a speaker and/or output jack, a display 474, and a user input device 476 such as a keypad and/or pointing device. If the network interface 468 includes a wireless local area network interface, an antenna (not shown) may be included.

The phone control module 460 may receive input signals from the cellular network interface 467, the network interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the network interface 468, and the audio output 472.

Memory 464 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 466 may include an optical storage drive, such as a DVD drive, and/or a hard disk drive (HDD). The power supply 462 provides power to the components of the cellular phone 458.

Figure 8E:
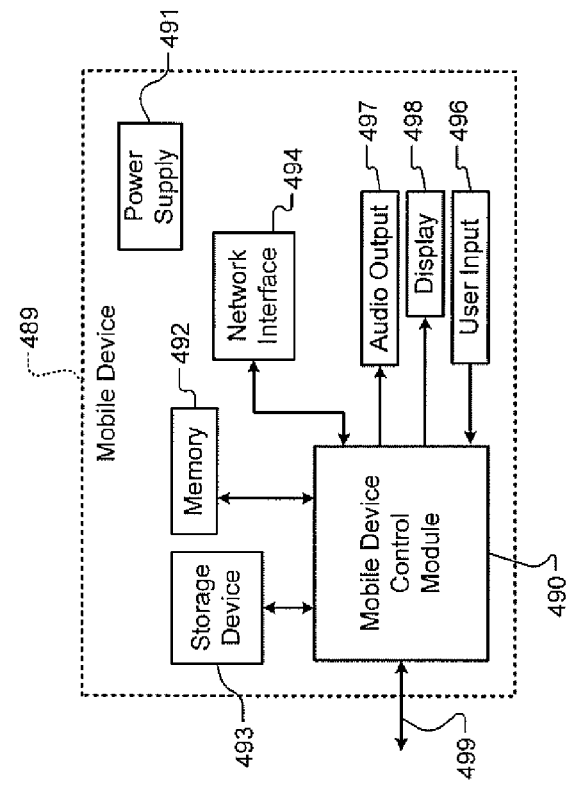
FIG. 8E is a functional block diagram of a mobile device.
Figure 8D:
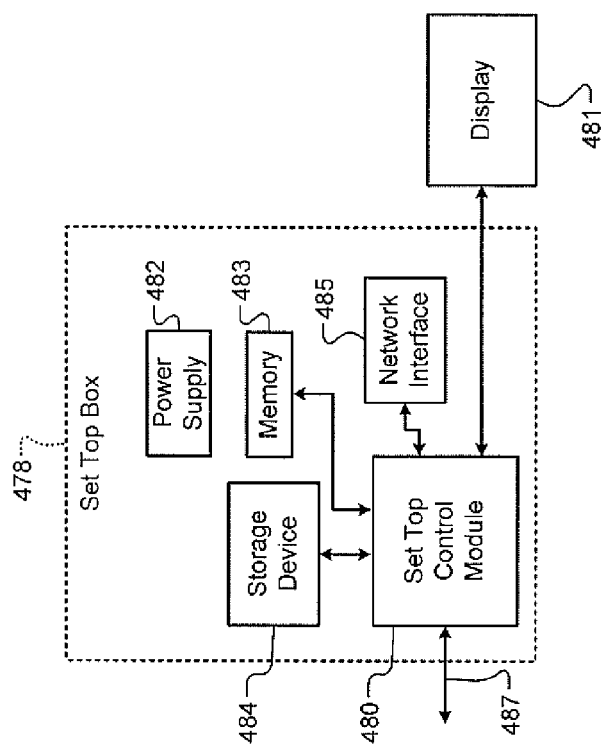
FIG. 8D is a functional block diagram of a set top box.

Referring now to FIG. 8D, the teachings of the disclosure can be implemented a network interface of a set top box 478. The set top box 478 includes a set top control module 480, a display 481, a power supply 482, memory 483, a storage device 484, and the network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 484 may include an optical storage drive, such as a DVD drive, and/or a hard disk drive (HDD).

Referring now to FIG. 8E, the teachings of the disclosure can be implemented in a network interface of a mobile device 489. The mobile device 489 may include a mobile device control module 490, a power supply 491, memory 492, a storage device 493, the network interface 494, and an external interface 499. If the network interface 494 includes a wireless local area network interface, an antenna (not shown) may be included.

The mobile device control module 490 may receive input signals from the network interface 494 and/or the external interface 499. The external interface 499 may include USB, infrared, and/or Ethernet. The input signals may include compressed audio and/or video, and may be compliant with the MP3 format. Additionally, the mobile device control module 490 may receive input from a user input 496 such as a keypad, touchpad, or individual buttons. The mobile device control module 490 may process input signals, including encoding, decoding, filtering, and/or formatting, and generate output signals.

The mobile device control module 490 may output audio signals to an audio output 497 and video signals to a display 498. The audio output 497 may include a speaker and/or an output jack. The display 498 may present a graphical user interface, which may include menus, icons, etc. The power supply 491 provides power to the components of the mobile device 489. Memory 492 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 493 may include an optical storage drive, such as a DVD drive, and/or a hard disk drive (HDD). The mobile device may include a personal digital assistant, a media player, a laptop computer, a gaming console, a speaker, or other mobile computing device.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A first network device comprising:
a clock module configured to generate a clock signal; and
a clock control module configured to
measure, using the clock signal, a time at which a first signal is received from a second network device,
generate a second signal based on the time at which the first signal is received from the second network device,
receive a third signal from a third network device in response to the third network device receiving (i) the first signal from the second network device and (ii) the second signal from the first network device, and
control a frequency of the clock signal based on the third signal.

2. The first network device of claim 1, wherein:
the clock control module is further configured to control a phase of the clock signal based on the third signal.

3. The first network device of claim 1, wherein the first network device is configured in accordance with a standard for configuring wireless networks and devices.

4. The first network device of claim 3, wherein standard for configuring wireless networks and devices comprises one or more of 802.11, 802.11a, 802.11b, 802.11g, 802.11h, 802.11n, 802.16, and 802.20.

5. The first network device of claim 1, wherein the first network device comprises a laptop computer, a speaker, a DVD drive, a set top box, a cellular phone, a high definition television, or a mobile device.

6. The first network device of claim 1, wherein the first network device, the second network device, and the third network device are configured to operate in an infrastructure mode.

7. The first network device of claim 1, wherein the first network device, the second network device, and the third network device are configured to operate in an ad-hoc mode.

8. A method comprising:
at a first network device,
generating a first clock signal;
measuring, using the clock signal, a time at which a first signal is received from a second network device;
generating a second signal based on the time at which the first signal is received from the second network device;
receiving a third signal from a third network device in response to the third network device receiving (i) the first signal from the second network device and (ii) the second signal from the first network device; and
controlling a frequency of the clock signal based on the third signal.

9. The method of claim 8, further comprising:
at the first network device,
controlling a phase of the clock signal based on the third signal.

10. The method of claim 8, wherein the first network device is configured in accordance with a standard for configuring wireless networks and devices.

11. The method of claim 10, wherein standard for configuring wireless networks and devices comprises one or more of 802.11, 802.11a, 802.11b, 802.11g, 802.11h, 802.11n, 802.16, and 802.20.

12. The method of claim 8, wherein the first network device comprises a laptop computer, a speaker, a DVD drive, a set top box, a cellular phone, a high definition television, or a mobile device.

13. The method of claim 8, wherein the first network device, the second network device, and the third network device are configured to operate in an infrastructure mode.

14. The method of claim 8, wherein the first network device, the second network device, and the third network device are configured to operate in an ad-hoc mode.

15. A non-transitory computer-readable medium embodied with a software program comprising computer-executable instructions for causing a programmable processor to:
at a first network device,
generate a first clock signal;
measure, using the clock signal, a time at which a first signal is received from a second network device;
generate a second signal based on the time at which the first signal is received from the second network device;
receive a third signal from a third network device in response to the third network device receiving (i) the first signal from the second network device and (ii) the second signal from the first network device; and
control a frequency of the clock signal based on the third signal.

16. The non-transitory computer-readable medium of claim 15, further comprising instructions to cause the programmable processor to:
at the first network device,
control a phase of the clock signal based on the third signal.

17. The non-transitory computer-readable medium of claim 15, wherein the first network device is configured in accordance with a standard for configuring wireless networks and devices.

18. The non-transitory computer-readable medium of claim 15, wherein standard for configuring wireless networks and devices comprises one or more of 802.11, 802.11a, 802.11b, 802.11g, 802.11h, 802.11n, 802.16, and 802.20.

19. The non-transitory computer-readable medium of claim 15, wherein the first network device comprises a laptop computer, a speaker, a DVD drive, a set top box, a cellular phone, a high definition television, or a mobile device.

20. A system, comprising:
the first network device of claim 1;
the second network device; and
the third network device,
wherein the second network device is configured to transmit the first signal to the first network device and the third network device in response to receiving a request from the third network device to transmit the first signal.

* * * * *